United States Patent [19]
Wheeler

[11] Patent Number: 5,287,981
[45] Date of Patent: Feb. 22, 1994

[54] COLLAPSIBLE CHEESE CONTAINER

[75] Inventor: William E. Wheeler, Sodus, N.Y.

[73] Assignee: A. R. Arena Products, Inc., Rochester, N.Y.

[21] Appl. No.: 11,462

[22] Filed: Jan. 27, 1993

Related U.S. Application Data

[63] Continuation of Ser. No. 723,434, Jun. 28, 1991, abandoned.

[51] Int. Cl.⁵ ............................................. A23C 19/00
[52] U.S. Cl. ........................... 220/4.28; 220/4.31; 220/1.5; 99/458
[58] Field of Search ............... 220/1.5, 4.28, 4.31, 220/682; 99/458

[56] References Cited

U.S. PATENT DOCUMENTS

| | | | |
|---|---|---|---|
| 3,069,002 | 12/1962 | Hart | 220/4.28 X |
| 3,955,703 | 5/1976 | Zebarth | 220/6 |
| 3,989,156 | 11/1976 | Lowry | 220/4.31 |
| 4,002,261 | 1/1977 | Litchfield | 220/80 |
| 4,238,044 | 12/1980 | Roddier | 220/7 F |
| 4,428,487 | 1/1984 | Hepp | 211/126 |
| 4,456,142 | 6/1984 | Burling | 220/1.5 X |
| 4,492,153 | 1/1985 | Grabowski | 99/460 |
| 4,618,068 | 10/1986 | Born | 220/4 R |
| 4,619,371 | 10/1986 | Rehrig | 220/71 |
| 4,674,647 | 6/1987 | Gyange et al. | 220/6 |
| 4,775,068 | 10/1988 | Reiland et al. | 220/6 |
| 4,820,383 | 4/1989 | Shchamorov et al. | 220/6 |
| 4,856,671 | 8/1989 | Reppel | 220/4.31 |
| 4,917,256 | 4/1990 | Kruck et al. | 220/4 F |
| 4,948,005 | 8/1990 | Garton et al. | 220/1.5 |
| 5,024,146 | 6/1991 | Dull | 99/458 |

Primary Examiner—Steven M. Pollard
Attorney, Agent, or Firm—Eugene Stephens & Associates

[57] ABSTRACT

A collapsible container for making and transporting cheese is made with four interlocking wall panels. Each of the panels is molded from a resin material with ribbed construction and with locking elements for engaging adjacent panels. The locking elements provide mechanical interlocks against relative movements of the panels along two axes that extend normal to the panels and frictional interlocks against relative movements of the panels along a third axis that extends normal to the other two axes. The mechanical interlocks also transmit a preload torque that resists angular diverging movements between the panels about the third axis. The preload torque bows the panels toward an interior space of the container before the container is filled with cheese.

12 Claims, 6 Drawing Sheets

COLLAPSIBLE CHEESE CONTAINER

RELATED APPLICATIONS

This application is a continuation of copending parent application Ser. No. 723,434, filed 28 Jun. 1991, now abandoned, entitled Collapsible Cheese Container. The parent application is hereby incorporated by reference.

BACKGROUND

Cheese is made within block-shaped containers that are also used to ship or otherwise transport the cheese for further processing. Some of the containers are made of stainless steel with permanently joined sides, and others are made with plywood sides that are temporarily held together between metal corners by banding. These containers have approximately 80 gallons (i.e., 304 liters) of capacity for making blocks of cheese weighing nearly 700 pounds (or about 315 kilograms).

The sides of the containers are assembled together to constitute a so-called "cheese hoop", which is used independently of a base and cover of the containers during the cheese-making process. The cheese is pressed from both the ends of the hoop to remove whey from the coagulated part of the cheese. The compressed cheese exerts large outward pressures against the cheese hoops, and the sides and joints between the sides of the cheese hoops must be especially strong to resist these pressures.

Finished cheese is extruded in large blocks from the stainless steel containers for further processing, whereas the sides of the plywood containers can be taken apart to remove the blocks of cheese. Once removed from the containers, the blocks of cheese are further processed by forcing the blocks through a matrix of wire cutters for cutting the blocks into a number of smaller chunks. Any departure of the blocks from squareness and flatness, such as bowing, produces waste that is trimmed from the exterior of the blocks and discarded.

Accordingly, the cheese containers must be made to exacting tolerances and be especially rigid. In fact, the containers are generally required to hold dimensions of the finished cheese blocks to within 3/16$^{ths}$ of an inch (or approximately 5 millimeters). However, the stainless steel containers tend to become dented with repeated use and produce increasing amounts of scrap. The dents also make extruding the blocks of cheese from the stainless steel containers more difficult. The plywood containers are much cheaper than the stainless steel containers and resist denting; but the plywood poses sanitation problems, and the containers are difficult to assemble. The plywood is waxed for sanitary reasons and must be refurbished before the container can be used again to make cheese.

SUMMARY OF INVENTION

My invention is a collapsible container that is made of a resin material for making and transporting cheese. The resin container resists denting and is much easier to clean and assemble than known containers made with reinforced plywood. In addition, the container does not require any refurbishing between uses, forms cheese to exacting dimensions, and can be reassembled with exceptional accuracy.

One example of my cheese container includes four interlocking wall panels surrounding an interior space. The interior and exterior dimensions of the wall panels are designed to be generally compatible with existing cheese-making machinery. Once filled with cheese, a base and a cover can be used to enclose top and bottom ends of the container. Each of the wall panels includes a bottom end, a top end, and two side ends joining inner and outer faces. The wall panels are interlocked by locking elements that are molded integrally with the wall panels. The locking elements produce tensive forces in the inner faces of the wall panels and compressive forces in the outer faces of the wall panels.

The tensive and compressive forces are of sufficient magnitude to bow the inner and outer faces of the wall panels toward the interior space of the containers. However, the wall panels can be bowed slightly away from the interior space when the space is filled with cheese. In this way, the container can be made to accommodate some flexibility in the wall panels without significantly departing from a desired shape for forming the cheese in accurately dimensioned blocks. The tensive and compressive forces also combine to provide preload torques that increase stiffness of the interlocks and resist angular movement between the wall panels.

The locking elements form both mechanical and frictional interlocks between the panels. The mechanical interlocks prevent relative movement between adjacent wall panels along first and second axes that extend normal to the respective inside surfaces of adjacent wall panels, and the frictional interlocks resist relative diverging movement along a third axis that extends along the inside surfaces normal to the other two axes. However, the mechanical interlocks are engaged by relative converging movement between the panels along the third axis.

The locking elements include male and female locking elements that are formed integrally with the respective adjacent panels. The male locking elements are formed in columns as hook-shaped tenons that project from the side ends of two of the panels, and the female locking elements are formed in columns as mortises that are accessible through the inner faces of the other two panels. The mortises are formed through the inner faces in a ladder-like configuration of continuous inner and outer side ribs interconnected by spaced intermediate cross ribs.

Within the mortises, wedge-shaped inner side lugs interconnect the continuous inner side ribs with the intermediate cross ribs. Respective inclined faces of the wedge-shaped lugs provide clearance with the tenons, but respective front faces of the same lugs provide for mechanically engaging the tenons. The mechanical engagements of these front faces prevent relative diverging movements between the tenons and mortises along the first axis. The side end of the panel from which the tenons project butts against the inner face of the adjacent panel to prevent relative converging movement between the panels in an opposite direction along the first axis.

Outer side lugs project into the mortises from the continuous outer side ribs for engaging outer side faces of the tenons to prevent relative diverging movement along the second axis. The continuous inner side ribs engage inner side faces of the tenons to prevent relative converging movement along the second axis. In addition, the outer side lugs and the continuous inner side ribs frictionally engage the respective side faces of the tenons to resist relative diverging movement between the panels along the third axis.

The mortises also include bottom lugs projecting from the intermediate cross ribs for mechanically interlocking the tenons and mortises against relative angular rotation about the first axis. The bottom lugs also help to oppose relative diverging movements along the first and second axes and to limit relative converging movement along the third axis. In addition, the bottom lugs include detents that provide a snap-fit type mechanical engagement for further resisting relative diverging movement along the third axis.

Most of the mating surfaces that are used to form mechanical interlocks also participate in opposing angular diverging movements between the panels about the third axis. In addition, the mechanical interlocks between adjacent panels are made at a slightly acute angle so that when all four sides are assembled, the inner faces are placed in a state of tension and the outer faces are placed in a state of compression. This produces the desired bowing of the wall panels and establishes a preload torque between adjacent panels further opposing angular diverging movements about the third axis.

DRAWINGS

DETAILED DESCRIPTION

Figure 1:
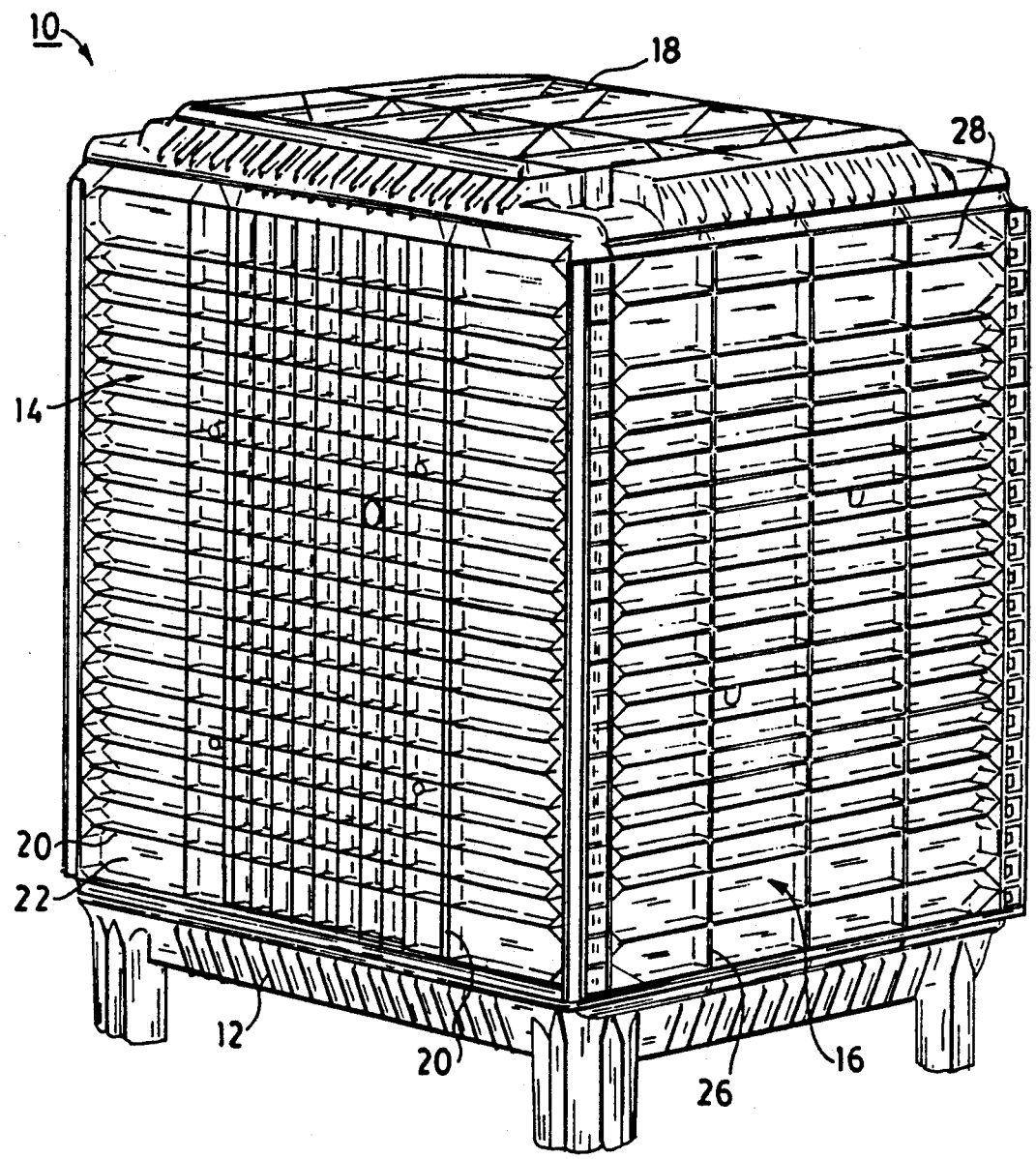
FIG. 1 is a perspective view of a collapsible cheese container in accordance with the present invention with a base and cover attached for transporting cheese.

A preferred embodiment of my invention is depicted in the drawing figures as a collapsible cheese container 10. With particular reference to FIG. 1, the container 10 is fully assembled to include a base 12 that extends in a horizontal plane, interlocking wall panels 14 and 16 that extend in respective vertical planes, and a cover 18 that also extends in the horizontal plane. Not shown, but obviously apparent, are two other wall panels that complete an overall form of the box as a rectangular parallelepiped.

Figure 2:
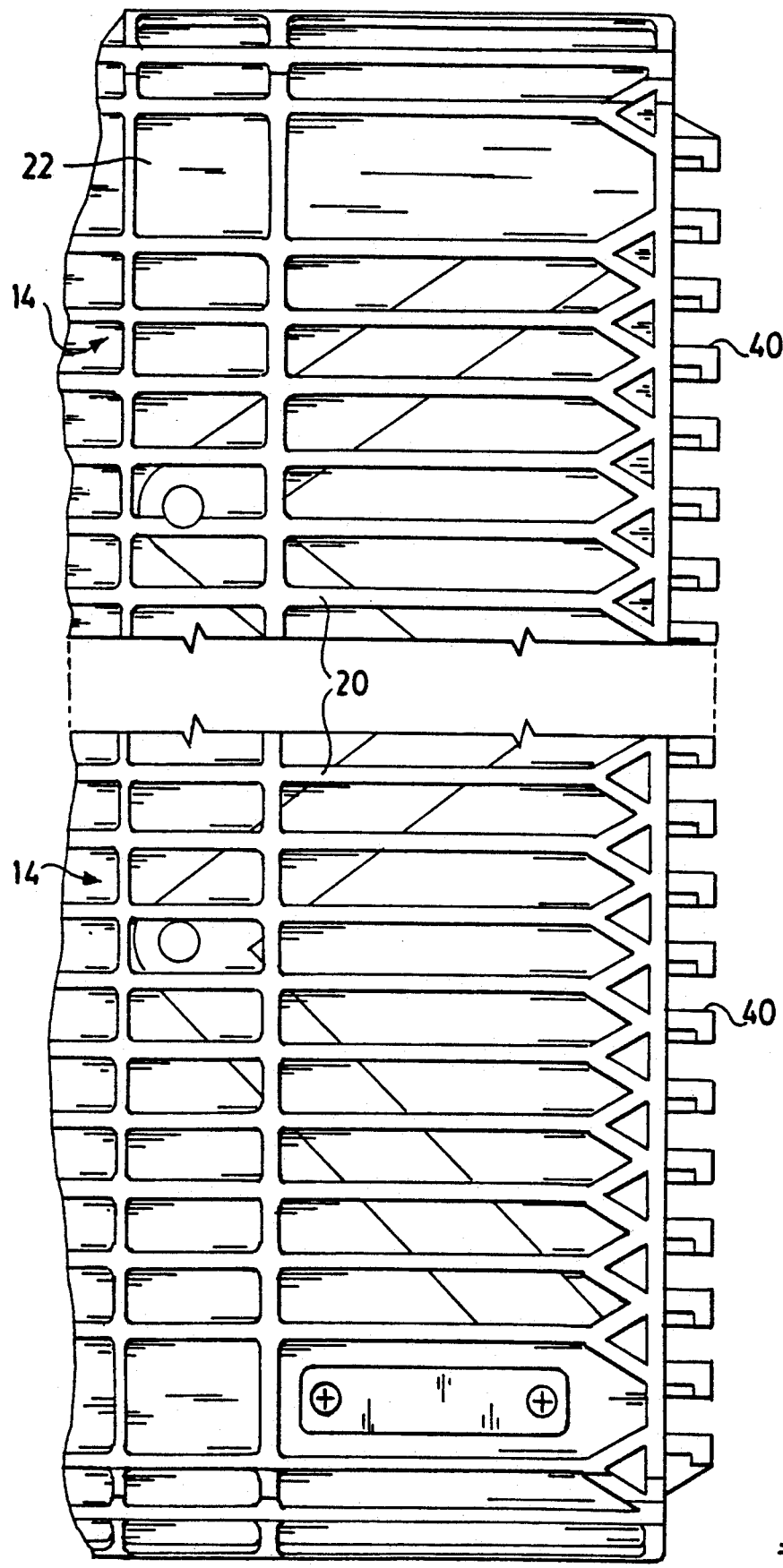
FIG. 2 is a fragmentary view of a side panel showing a series of hook-shaped tenons projecting from one end.
Figure 3:
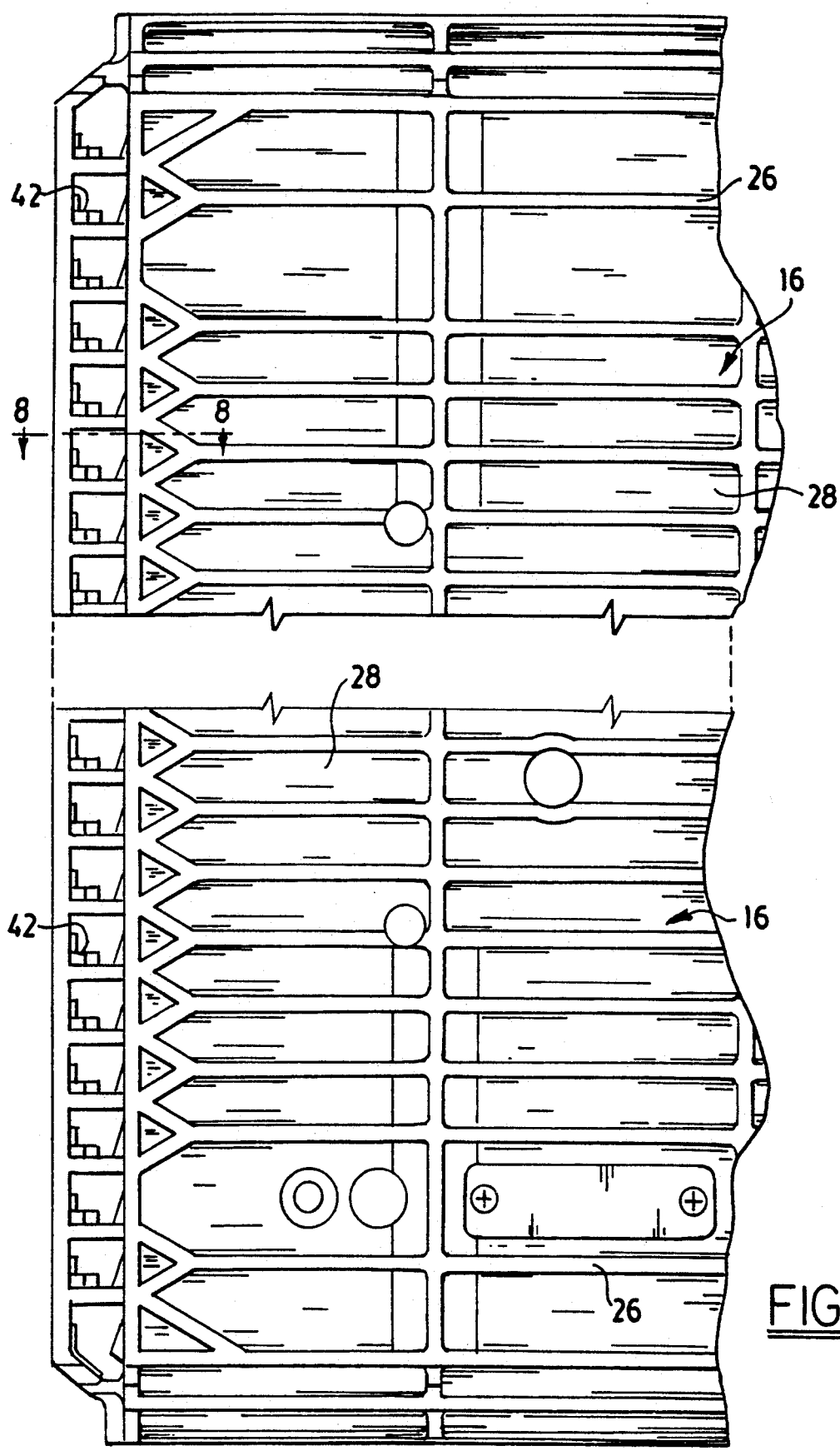
FIG. 3 is a fragmentary view of another side panel showing a series of mortises formed through both inner and outer faces of the panel.

The container 10 is molded from a resin material, such as acrylonitrile-butadiene-styrene or ABS resin, with an exterior ribbed construction which adds rigidity to the panels, reduces their weight relative to their strength, and helps to radiate heat produced during the cheese-making process over a much larger area of the container's exterior. For example, the wall panel 14 shown in FIG. 2 includes a matrix of ribs 20 that project from a backing web 22 to form an outer face 24 of the panel. Similarly, the wall panel 16 shown in FIG. 3 includes a matrix of ribs 26 that project from a backing web 28 and form outer face 30 However, respective inner faces 32 and 34 of the panels 14 and 16, designated in the cross-sectional view of FIG. 4, are smooth to avoid making any imprints in the cheese.

Figure 4:
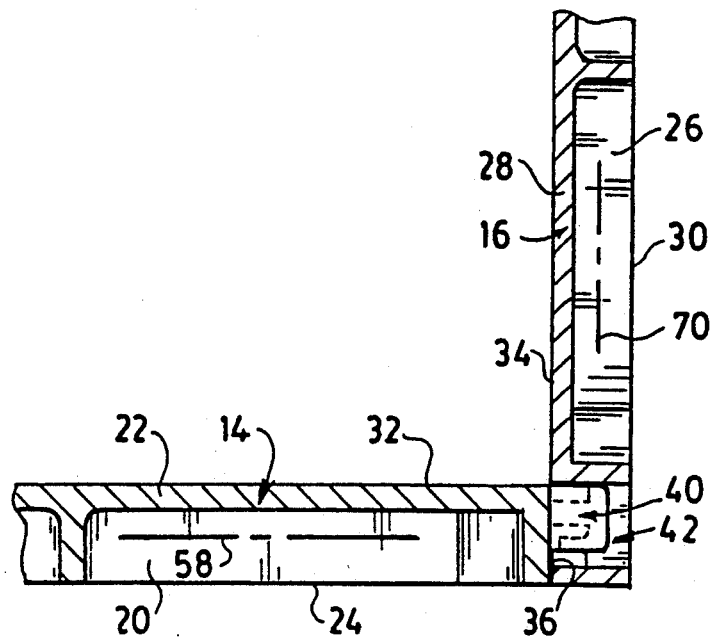
FIG. 4 is a fragmentary cross-sectional top view of the two panels joined together to form a corner of the container.
Figure 5:
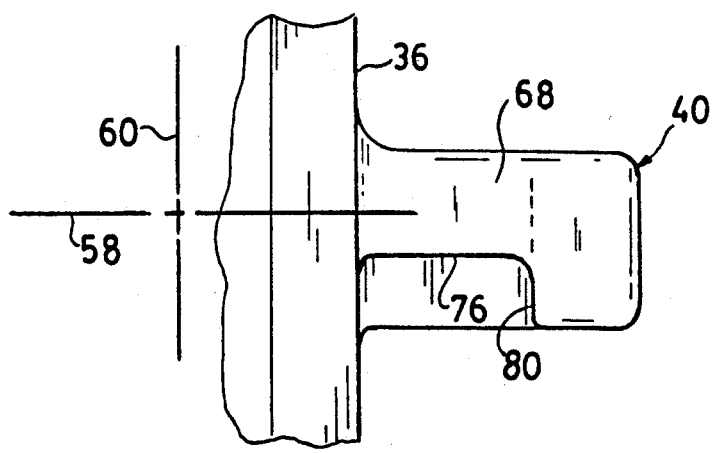
FIG. 5 is an enlarged side view of one of the tenons.
Figure 6:
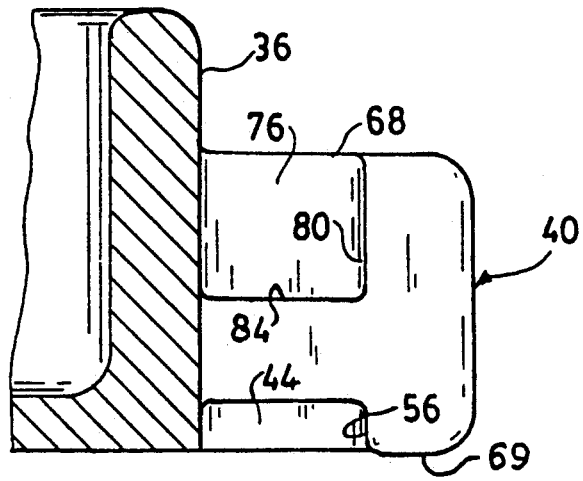
FIG. 6 is an enlarged bottom view of the same tenon.
Figure 8:
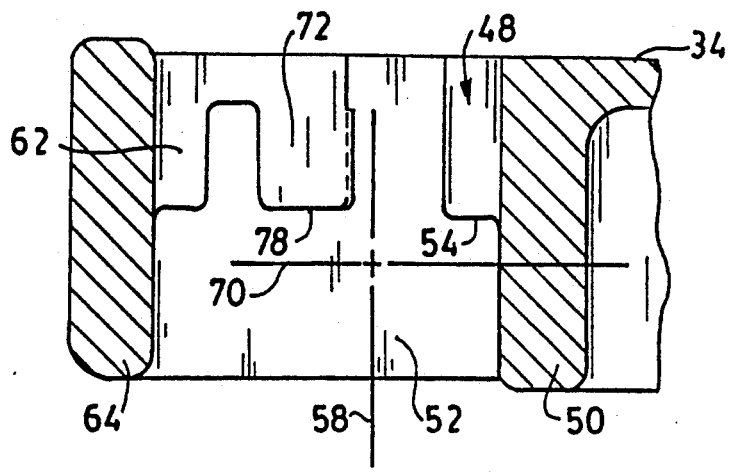
FIG. 8 is an enlarged cross-sectional top view of the same mortise.
Figure 7:
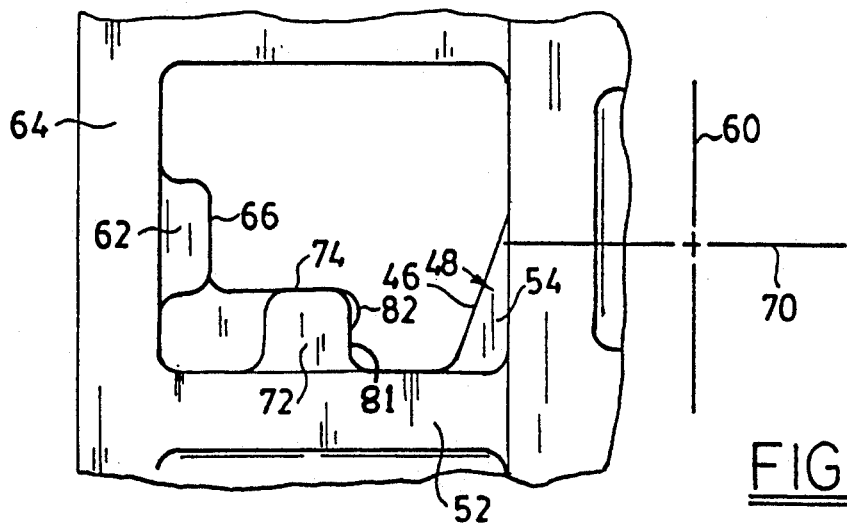
FIG. 7 is an enlarged side view of one of the mortises.
Figure 9:
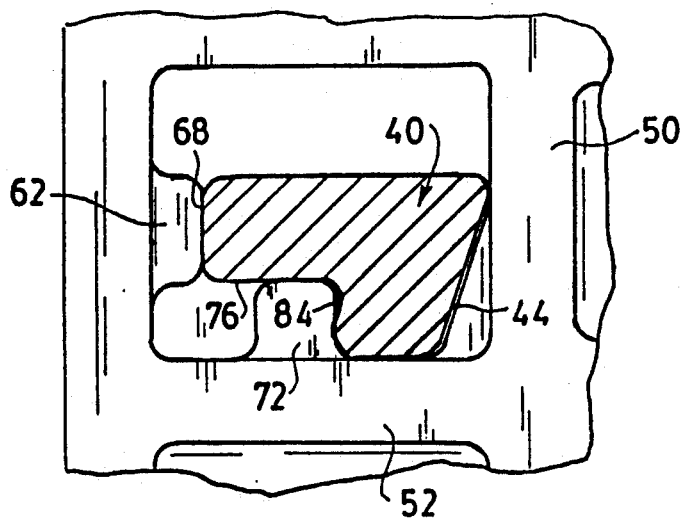
FIG. 9 is an enlarged side view of the mortise similar to FIG. 7 but also showing a cross-sectional end view of the tenon engaged with mating surfaces in the mortise.

The two panels 14 and 16 are shown joined together in FIG. 4 in a manner that is repeated at each of the four corners of the container. The depicted corner is formed by butting a side end face 36 of the panel 14 against the inner face 34 of the panel 16. The side end face 36 and the abutted portion of the inner face 34 define a joint between the two adjacent panels. However, a column of hook-shaped tenons 40 projects from the side end face 36 of the panel 14 through the inner face 34 of panel 16 into engagement with mating faces of a column of specially configured mortises 42.

The mating faces, apparent in one or more of the remaining drawing figures, include mating faces formed by inner side lugs 48 that are located adjacent to the continuous inner side ribs 50. The inner side lugs 48 are wedge shaped and also function as gussets connecting continuous inner side ribs 50 with intermediate cross ribs 52 of the mortises. Inclined faces 46 of the wedge-shaped lugs provide clearance for inclined faces 44 of the tenons. However, front faces 54 of the wedge-shaped lugs, which extend parallel to inner face 34, mate with back wedge faces 56 formed in the tenons, providing respective mechanical interlocks that prevent diverging movement between the panels along a first horizontal axis 58. The mechanical interlocks between front faces 54 and back wedge faces 56 are engaged by relative converging movement between the two panels along a vertical axis 60 that extends along the side end face 36.

The vertical converging movement between the two panels also engages outer side faces 68 of the tenons against end faces 66 of outer side lugs 62 that project into the mortise from continuous outer side ribs 64. The engagements of the outer side lugs 62 with the tenons 40 provide mechanical interlocks for preventing relative diverging movement between the panels along a second horizontal axis 70. Inner side faces 69 of the tenons bear against the continuous inner side ribs 50, forming mechanical interlocks for preventing converging movement between the panels in an opposite direction along the second horizontal axis 70. The end faces 66 of the outer side lugs and continuous inner side ribs 50 complete a series of frictional interlocks with the side faces 68 and 69 of the tenons for resisting relative diverging movement between the panels along the vertical axis 60.

For further reference, both horizontal axes 58 and 70 may be understood to extend parallel to the horizontal plane of the base 12. However, the axis 58 extends normal to the wall panel 16, whereas the axis 70 extends normal to the wall panel 14. The vertical axis 60 extends normal to both horizontal axes 58 and 70.

The mortises also include bottom lugs 72 that project from the intermediate cross ribs 52. The bottom lugs 72 include end faces 74 that mate with recessed bottom faces 76 of the tenons to limit the converging movement along the vertical axis 60 which engages the mechanical interlocks. Side faces 81 of the bottom lugs 72 engage undercut faces 84 of the tenons to form mechanical interlocks both for further resisting relative diverging movement between panels along the second horizontal axis 70 and for preventing relative angular movement between the tenons and mortises about the first horizontal axis 58. Front faces 78 of the bottom lugs 72 also mate with back faces 80 of the tenons to supplement the mechanical interlock provided between front faces 54 of the wedge-shaped lugs and mating back wedge faces 56 of the tenons to prevent relative diverging movement along the first horizontal axis 58.

The bottom lugs 72 are also formed with detents 82 that engage the undercut faces 84 of the tenons to provide a snap-fit engagement between the tenons and mortises. The snap-fit engagement provides a mechanical interlock that supplements the frictional interlock for opposing relative diverging movement between the panels along the vertical axis 60.

The continuous inner and outer side ribs 50 and 62 also guide the tenons 40 along the horizontal axis 70 into positions that are required to move the tenons along the vertical axis 60 between disengaged and engaged positions within the mortises 42. In addition, only limited movement is required along the vertical axis 60 to engage the tenons 40. For example, the distance required to move the tenons 40 between disengaged and engaged positions within the mortises 42 corresponds to the height of the bottom lugs 72, measured between the top end faces 72 and the intermediate cross ribs 52 from which the bottom lugs project. This height is much less than the height of the tenons along the vertical axis 60 and permits the tenons to be positioned close together along the side end face 36.

Figure 10:
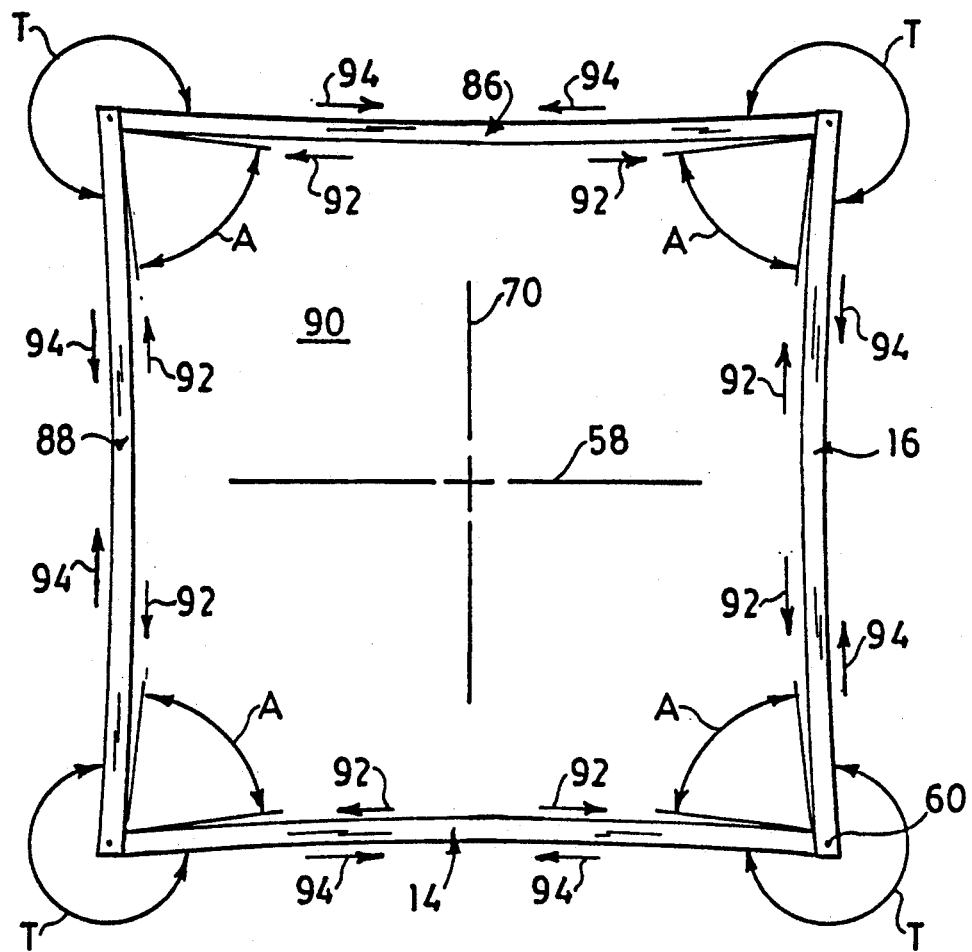
FIG. 10 is a schematic top view taken through the container of FIG. 1 showing four walls bowed into an interior space.

In FIG. 10, a schematic top view through the container shows an assembly of four walls including the wall panels 14 and 16, as well as first depictions of the other two wall panels 86 and 88. The four panels surround an empty interior space 90 that can be filled with cheese. Each of the panels is adjacent to two other panels forming respective joints that are similar to the joint between panels 14 and 16, and the further discussion of how the panels are joined continues to be made with reference to the panels 14 and 16.

For example, preload torque "T" opposes angular diverging movements between the panels, including the diverging movements between panels 14 and 16 about vertical axis 60. The preload torque is established in part by slightly offsetting the continuous outer side ribs 64 with respect to the continuous inner side ribs 50 of the column of mortises along the horizontal axis 58. The offset has the effect of changing the angular orientation of the abutting portion of the inner face 34 of panel 16 with respect to the side end face 36 of the panel 14 so that the two panels interlock at a slightly acute angle "A". However, during assembly of the container 10, the panels are bent angularly apart by an amount which permits the four panels to be joined together in a generally rectangular shape.

The bending of the panels 14 and 16 places the adjacent inner faces 32 and 34 in a state of tension and the adjacent outer faces 24 and 30 in a state of compression. The tension in the panels, indicated by arrows 92, is transmitted primarily between the front faces 54 of the wedge-shaped lugs located next to the continuous inner side ribs 50 and the mating back wedge faces 56 of the tenons. The compression in the panels, indicated by arrows 94, is transmitted between portions of the continuous outer side ribs 64 that form part of the inner face of panel 16 and the side end face 36 of panel 14.

Since the tensive forces are transmitted through an inner part of the joints between adjacent panels and the compressive forces are transmitted through an outer part of the same joints, a preload torque is established that urges the panels angularly together. Also, since the panels are made with sufficient flexibility to be bent apart and interlock with each other at four corners, each of the panels tends to bow toward an interior space of the container. However, the magnitude of the preload torque, together with the amount of flexibility in the wall panels, is adjusted so that the panels are bowed slightly away from the interior space when the container is filled with cheese.

I claim:

1. A collapsible container formed from a resin material for making and transporting cheese comprising:
   a base;
   four wall panels mounted on said base;
   each of said wall panels having inner and outer faces and two end faces joining said inner and outer faces;
   four columns of tenons projecting from said end faces of the panels;
   four columns of mortises formed through said inner faces of the panels in ladder-like configurations of continuous inner and outer side ribs interconnected by spaced intermediate cross ribs;
   said continuous outer side ribs forming four of said end faces of the wall panels; and
   inner side lugs formed within said mortises adjacent to said continuous inner side ribs for mechanically engaging said tenons to prevent relative diverging movement between adjacent panels along a first of three orthogonal axes.

2. The container of claim 1 in which said inner side lugs are wedge-shaped lugs that are formed as gussets interconnecting said continuous inner side ribs and said intermediate cross ribs.

3. The container of claim 2 in which said wedge-shaped lugs include an inclined face for providing clearance with said tenons and a front face that extends parallel to said inner face for mechanically engaging said tenons to prevent relative diverging movement between said adjacent panels along said first axis.

4. The container of claim 1 further comprising outer side lugs formed within said mortises adjacent to said continuous outer side ribs for mechanically engaging said tenons to prevent relative diverging movement between said adjacent panels along a second of said three orthogonal axes.

5. The container of claim 4 further comprising bottom lugs formed within said mortises adjacent to said intermediate cross ribs for mechanically engaging said tenons to prevent relative rotation between said adjacent panels about said first axis.

6. The container of claim 5 in which said bottom lugs include detents for providing a snap-fit engagement with said tenons to resist relative movement between said adjacent panels along a third of said three orthogonal axes.

7. The container of claim 1 in which said continuous inner and outer side ribs are arranged for guiding said tenons in along a second of said three orthogonal axes into positions within said mortises required to move said tenons along a third of said three orthogonal axes between disengaged and engaged positions.

8. The container of claim 7 in which said tenons have an overall height along said end faces that is greater than a distance required to move said tenons along said third axis between the disengaged and engaged positions.

9. The container of claim 1 in which said columns of tenons and mortises mechanically interlock said adjacent wall panels at an acute angle in each of four corners for producing tensive forces in said inner faces and compressive forces in said outer faces.

10. The container of claim 9 in which said continuous outer side ribs are offset with respect to said continuous inner side ribs along said first axis for interlocking said adjacent wall panels at the acute angles.

11. The container of claim 10 in which said wall panels enclose an interior space, and said tensive and compressive forces are of sufficient magnitude to bow said inner and outer faces of the wall panels toward said interior space.

12. The container of claim 11 in which said tensive and compressive forces are limited in magnitude to permit said wall panels to bow slightly away from said interior space when said interior space is filled with cheese.

* * * * *